UNITED STATES PATENT OFFICE.

HANS BELART, OF HUDDERSFIELD, ENGLAND.

PROCESS OF MAKING INDIGO, &c.

No. 868,755.

Specification of Letters Patent.

Patented Oct. 22, 1907.

Application filed September 13, 1906. Serial No. 334,413.

To all whom it may concern:

Be it known that I, HANS BELART, a citizen of Switzerland, residing at Huddersfield, in the county of York, Kingdom of Great Britain, have invented new and useful Improvements in Processes for the Manufacture of Indigo and other Products Formed by Condensation, of which the following is a specification.

Through the German Patent No. 137955, the use of sodium-amid in the manufacture of indigo became known. I have however discovered that by employing potassium and sodium compounds of anilin, naphthylamin, diphenylamin, tolylamin, xylylamin, as condensing agents results are obtained which practically gives theoretical yields. In this manner indigo can be obtained by heating most of the intermediate products to-day used in the manufacture of synthetical indigo with these condensing agents.

Example I. In 500 parts of anilin add under most energetic agitation 36 parts of sodium while heating. When the sodium has completely disappeared add gradually 150 parts absolutely dry di-sodium salt of phenylglycin-ortho-carboxylic acid, and heat with reflux-condenser. When the reaction is terminated the excess of anilin is distilled in vacuo. The residue is dissolved in water and the indigo is isolated by the usual known methods.

Example II. In 500 parts of anilin add gradually under agitation 59 parts of finely powdered sodium-amid, and heat while agitating, until all the ammonia is disengaged, and the sodium-phenylamid is formed. Now add 150 parts absolutely dry di-sodium salt of phenyl-glycin-ortho-carboxylic acid gradually, and heat with reflux condenser. When the reaction is terminated, the excess of anilin is distilled in vacuo. The residue is dissolved in water and the indigo is isolated by the usual known methods.

I claim:

The process of making indoxyl and its derivatives, consisting in heating phenylglycin in presence of arylamins with aryl-sodium.

In testimony whereof I have signed my name to this specification in the presence of two subscribing witnesses.

HANS BELART.

Witnesses:
ALFRED ROSSHARDT,
STANLEY E. BRAMALL.